United States Patent
Bharath et al.

(10) Patent No.: US 6,625,128 B1
(45) Date of Patent: *Sep. 23, 2003

(54) METHOD AND APPARATUS FOR PRIORITIZING PACKET DATA TRANSMISSION AND RECEPTION

(75) Inventors: Jagannathan Bharath, Eldorado Hills, CA (US); David N. Larson, Austin, TX (US)

(73) Assignee: Legerity, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,982
(22) Filed: Jun. 28, 1999
(51) Int. Cl.$^7$ .................................................. H04B 7/00
(52) U.S. Cl. ..................................................... 370/310
(58) Field of Search ............................... 370/282, 314, 370/321, 349, 458, 459, 474, 498, 500, 225, 228, 278, 280, 310, 312; 455/510; 714/736

(56) References Cited

U.S. PATENT DOCUMENTS

| | | | | |
|---|---|---|---|---|
| 4,377,859 A | * | 3/1983 | Dunning et al. | 370/376 |
| 4,809,268 A | * | 2/1989 | Tejima et al. | 370/346 |
| 4,970,714 A | * | 11/1990 | Chen et al. | 370/216 |
| 5,691,709 A | * | 11/1997 | Guntin | 340/7.22 |
| 5,748,624 A | * | 5/1998 | Kondo | 370/347 |
| 5,768,265 A | * | 6/1998 | Toyohara | 340/825.52 |
| 5,907,539 A | * | 5/1999 | Riley | 340/3.1 |
| 6,028,866 A | * | 2/2000 | Engel et al. | 370/461 |
| 6,163,543 A | * | 12/2000 | Chin et al. | 370/400 |
| 6,181,931 B1 | * | 1/2001 | Alldredge | 370/321 |
| 6,215,778 B1 | * | 4/2001 | Lomp et al. | 370/335 |
| 6,317,418 B1 | * | 11/2001 | Raitola et al. | 370/277 |
| 6,332,080 B1 | * | 12/2001 | Kordsmeyer | 370/319 |
| 6,393,008 B1 | * | 5/2002 | Cheng et al. | 370/338 |
| 6,400,949 B1 | * | 6/2002 | Bielefeld et al. | 455/434 |
| 6,421,317 B1 | * | 7/2002 | Denecheau et al. | 370/222 |
| 6,430,661 B1 | * | 8/2002 | Larson et al. | 711/158 |

* cited by examiner

Primary Examiner—Hassan Kizou
Assistant Examiner—Dmitry Levitan
(74) Attorney, Agent, or Firm—Williams, Morgan & Amerson, P.C.

(57) ABSTRACT

A method and apparatus are provided, where the method includes defining a first portion of a memory for receiving data, providing a memory request to transfer data from a source to the first portion of the memory defined to receive the data, and transferring a portion of data from the source to the first portion of the memory according to a priority scheme that determines the sequence of the data transfer, wherein the size of the portion of the data substantially corresponds to the size of the first portion of the memory. The method also includes associating a frame with at least one corresponding memory location containing data in the first portion of the memory, transmitting at least a portion of data from the first portion of the memory within the frame, and receiving an acknowledgement in response to transmitting the data within the frame.

37 Claims, 13 Drawing Sheets

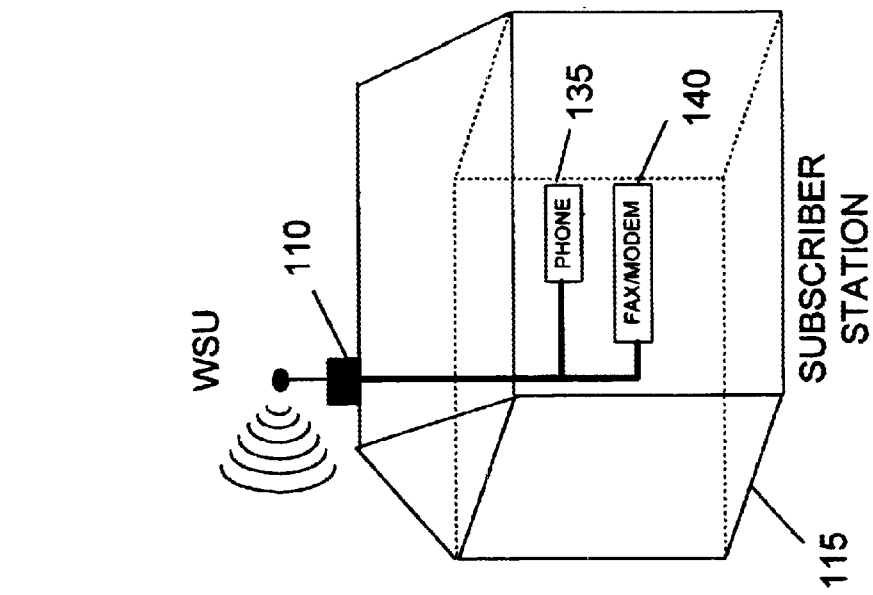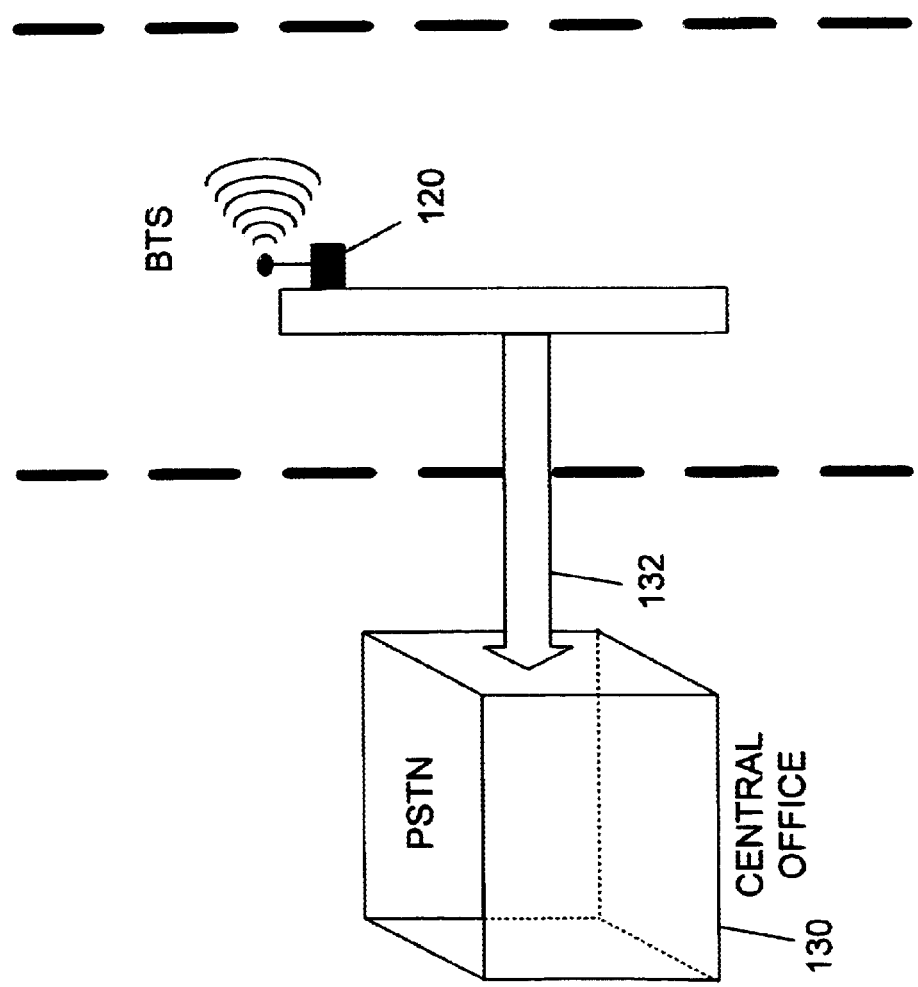
FIGURE 1 (PRIOR ART)

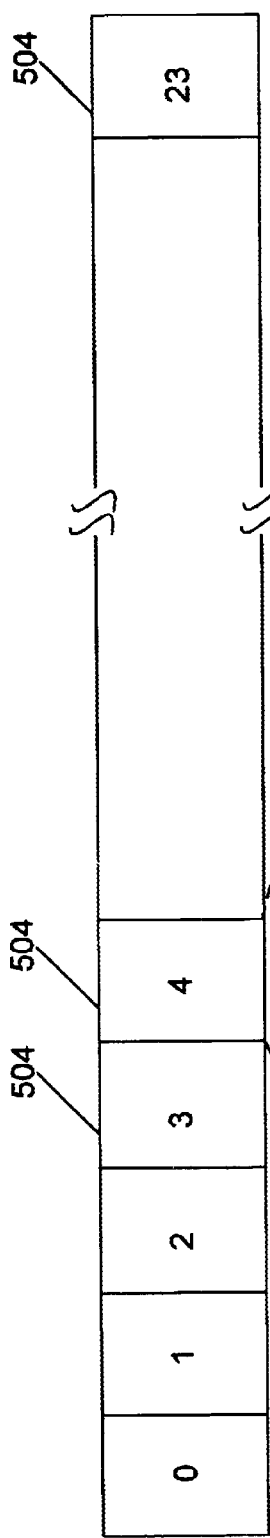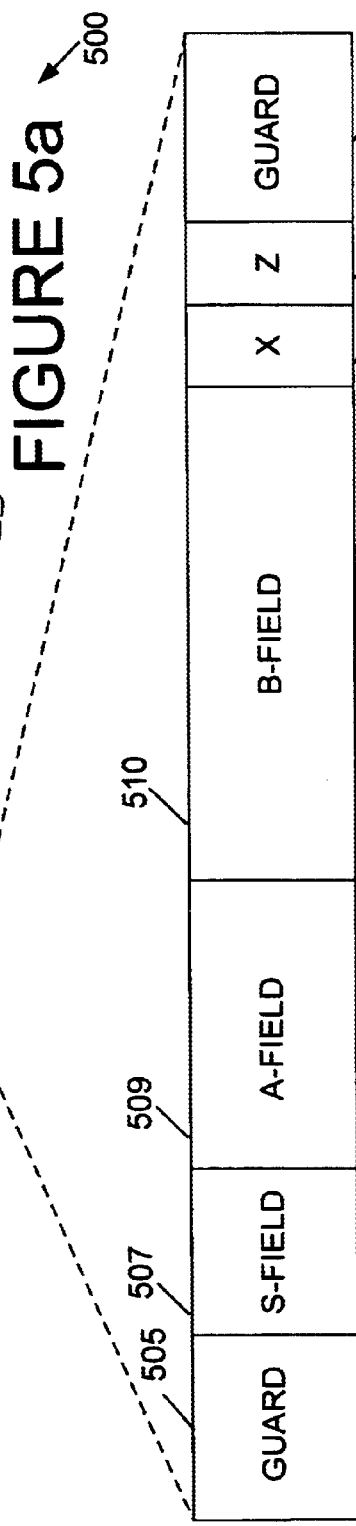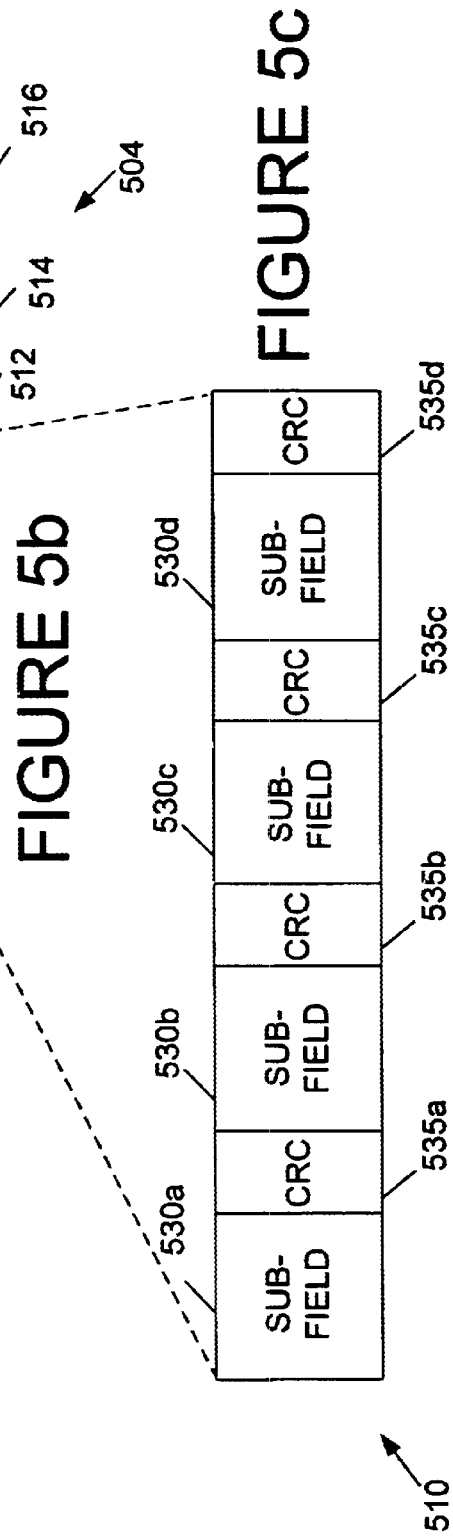

| SLOT # | PACKET DATA ACTIVE | CARRIER TYPE | PACKET DATA BUFFER |
|---|---|---|---|
| SLOT 0 | | | |
| SLOT 1 | | | |
| SLOT 2 | | | |
| SLOT 3 | | | |
| SLOT 4 | | | |
| ... | ... | ... | ... |
| SLOT 21 | | | |
| SLOT 22 | | | |
| SLOT 23 | | | |

| FRAME PORTION | LBNS | SLOT NUMBER |
|---|---|---|
| FIRST HALF OF THE FRAME | LBN1 | |
| | LBN2 | |
| | LBN3 | |
| | ••• | |
| | LBN13 | |
| | LBN14 | |
| SECOND HALF OF THE FRAME | LBN1 | |
| | LBN2 | |
| | LBN3 | |
| | ••• | |
| | LBN13 | |
| | LBN14 | |

METHOD AND APPARATUS FOR PRIORITIZING PACKET DATA TRANSMISSION AND RECEPTION

BACKGROUND OF THE INVENTION

1. Field of the Invention

This invention relates generally to transmission and reception of data, and, more particularly, to transmission and reception of packet data in communications systems.

2. Description of the Related Art

Modern day electronic products, such as computers and telecommunications devices, are generally faster and more efficient than their predecessors. Two important factors that have contributed to the improved performance of today's electronic products is the efficiency and faster rate at which these products transmit and receive signals. However, given the customer demand for faster and more responsive products, designers are constantly seeking ways to achieve a higher bandwidth while controlling the costs.

The overall performance of applications, particularly real-time telecommunication applications, can be improved by increasing the bandwidth available for transmitting signals. One example of a real-time telecommunication application where an increased bandwidth is desirable is a Wireless Local Loop (WLL) network.

Wireless Local Loop is quickly emerging as the technology that promises to deliver telephone service in geographical areas where using conventional copper telephone lines is cost prohibitive, or in a case where a telephone line exists, radio access technologies such as WLL provide other companies an opportunity to provide competitive services. Installing the last quarter of a mile of the telephone wire to a subscriber station is usually one of the most costly portions of the traditional telephone network, primarily because of the expenses associated with labor and maintenance. The telephone companies, which are usually responsible for maintaining the telephone wire, are frequently plagued with the daunting task of repairing the damage to the telephone lines caused by inclement weather, falling trees, digging, and by the recurring problem of copper wire theft. Accordingly, to circumvent the problems that are typically associated with the "traditional" telephone network, system designers turned to WLL technology, which is proving to be a promising and viable alternative.

FIG. 1 illustrates a block diagram of a WLL network 100. The WLL network 100 includes a Wireless Subscriber Unit (WSU) 110 at a subscriber station 115 that communicates with a remote Basestation Transceiver System (BTS) 120. The data flow from the WSU 110 to the BTS 120 is referred to as an uplink connection, and the data flow from the BTS 120 to the WSU 110 is referred to as a downlink connection. The BTS 120 links the WSU 110 to a central office 130, thus allowing a user at the subscriber station 115 to communicate with other subscriber stations (not shown) through the central office 130. A connection 132 between the BTS 120 and the central office 130 may be made via a wire-line, fiber or microwave link, depending on the bandwidth, distance, and the terrain.

The heart of the WLL network 100 is the "wireless" interface between the BTS 120 and the WSU 110, where the need for the copper loop is eliminated. The WSU 110, located in the home or office, provides a radio frequency (RF) interface to an existing phone 135 or modem 140, usually through an RJ-11 type plug (not shown). The connection between the subscriber station 115 and the central office 130 is typically as reliable and clear as the copper wire version.

The counterpart to the WSU 110 is the BTS 120, which is generally located in the field. As is common in most wireless systems, the BTS 120 serves as a control station for the WSU 110 by providing, over a designated pilot channel, synchronization and control information necessary to initiate and maintain two-way communication. In communication systems employing time division multiple access (TDMA), a process well known in the art. the WSU 110 selects the channel frequency and the specific time slot based upon the availability and quality of the channels in the coverage area.

Most wireless communication systems, including the WLL network 100, operate in accordance with industry defined standards. For example, two popular standards for the WLL network 100 are Personal Handyphone System (PHS) and Digital Enhanced Cordless Telecommunications (DECT). The PHS and DECT standards, as well as other WLL standards, define the format for transmitting and receiving data, error checking algorithm, retransmission scheme, and other such parameters that are relevant to wireless communications systems.

The DECT standard for the WLL network 100, for example, defines a 10-millisecond TDMA frame that comprises twenty-four time slots, where generally twelve slots are reserved for transmitting and twelve for receiving. DECT supports voice, analog data, and packet data communications. Voice and analog data communications are full duplex, whereas packet data communications are simplex in nature. Packet data communications can take advantage of directing all slots in one direction, uplink or downlink, with the exception of at least one slot for the reverse acknowledgement channel. Depending upon the bandwidth allocated by the system, an uplink or downlink channel can utilize between one and twenty-three slots for transferring packet data. When no data is waiting to be sent, the bandwidth is de-allocated and assigned to other users. Thus, in an uplink connection, the BTS 120 of the WLL network 100 can transmit data on up to twenty-three slots that are allocated for transmitting data per each frame to the WSU 110. Assuming all of the data is successfully transmitted over the twenty-three time slots, then new data may be transmitted on the twenty-three transmit time slots of the next frame. On the other hand, it not all of the data is successfully transmitted to the BTS 120 because of transmission errors, then that data is retransmitted over the twenty-three transmit time slots in accordance with the DECT retransmission scheme.

The retransmission scheme of a DECT WLL network requires an acknowledgment to be generated by the peer station on a slot-by-slot basis for duplex bearers. Double simplex bearers' acknowledgements are on a logical bearer number (LBN) basis contained in a MAC-MOD-2ACK message in a reverse bearer. The BTS 120 or the WSU 110 may be the peer station, depending on whether the connection is an uplink or downlink connection. That is, in an uplink connection, the BTS 120 is the peer station, and in a downlink connection, the WSU 110 is the peer station. A "good" acknowledgement, a request to advance, from the peer device indicates a good transmission and new data should be transmitted in the next frame. On the other hand, a "bad" acknowledgement, a request to retransmit, indicates a bad transmission, and thus requires retransmission of data that was not received correctly by the peer station.

The exchange of information between the WSU 110 and the BTS 120 occurs at very high speeds. Additionally, the high-speed communications between the WSU 110 and the BTS 120 is typically based on some sort of an acknowledgement scheme. To make an efficient use of the bandwidth available for communications, the WSU 110 and BTS 120 must generally be able to efficiently process and transmit/receive information in response to the acknowledgements transmitted from the peer station. For example, the WSU 110 must analyze the acknowledgements transmitted by the BTS 120 and determine if retransmission of data is required prior to transmission of the next available frame. Valuable bandwidth may be wasted if the WSU 110 is not able to timely process and transmit data in response to the acknowledgements from the BTS 120. Thus, to make efficient use of the bandwidth and thereby increasing data throughput, it desirable that the WSU 110 and the BTS 120 efficiently and expeditiously process the acknowledgements and then and transfer data to the peer station in response to the acknowledgements.

The present invention is directed to overcoming, or at least reducing the effects of, one or more of the problems set forth above.

SUMMARY OF THE INVENTION

In one aspect of the present invention, a method is provided. The method includes defining a first portion of a memory for receiving data, providing a memory request to transfer data from a source to the first portion of the memory defined to receive the data, and transferring a portion of data from the source to the first portion of the memory according to a priority scheme that determines the sequence of the data transfer, wherein the size of the portion of the data substantially corresponds to the size of the first portion of the memory. The method also includes associating a frame with at least one corresponding memory location containing data in the first portion of the memory, transmitting at least a portion of data from the first portion of the memory within the frame, and receiving an acknowledgement in response to transmitting the data within the frame.

In another aspect of the present invention, an apparatus is provided. The apparatus includes a source for providing data, a memory having a first portion configured to receive the data from the source, and an access controller capable of transferring data from the source to the first portion of the memory in response to a memory request. The apparatus also includes control logic capable of determining the size of the first portion of the memory and providing the memory access request to the access controller to transfer a portion of the data from the source that corresponds to the size of the first portion of the memory in accordance with a priority scheme that determines the sequence of the data transfer. The apparatus includes association logic capable of associating a frame with at least one corresponding memory location containing data in the first portion of the memory, means for transmitting at least a portion of data from the first portion of the memory within the frame, and means for receiving an acknowledgement in response to transmitting the data within the frame.

BRIEF DESCRIPTION OF THE DRAWINGS

The invention may be understood by reference to the following description taken in conjunction with the accompanying drawings, in which like reference numerals identify like elements, and in which:

FIG. 1 is a prior art illustration of a stylized block diagram of a WLL network;

FIGS. 5a–c illustrate a DFCT frame that may be utilized for transmitting packet data in accordance with the present invention;

FIG. 8 depicts an embodiment of a slot to buffer link table that may be utilized by the Wireless Subscriber Unit of FIG. 6;

FIG. 9 depicts an embodiment of a logical bearer number (LBN) to slot link table that may be utilized by the Wireless Subscriber Unit of FIG. 6;

Figure 2:
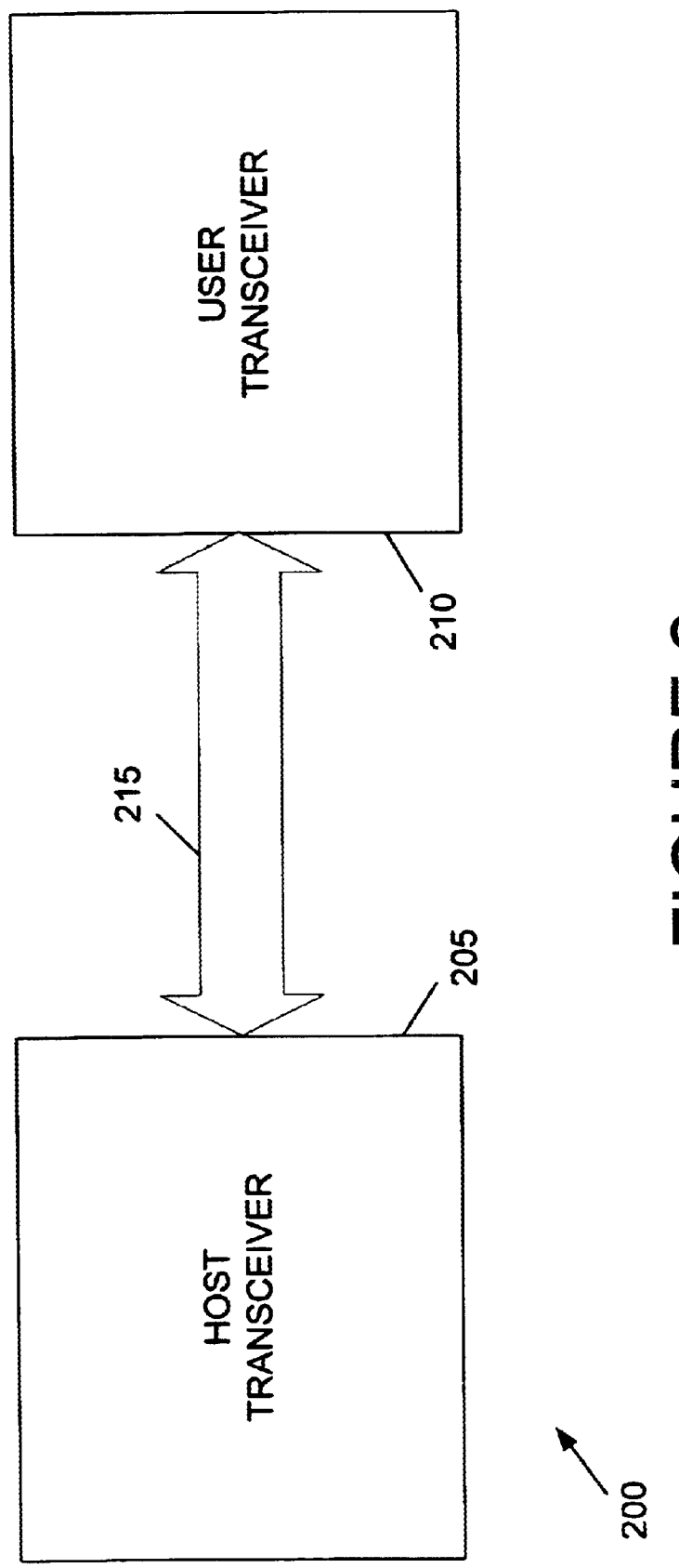
FIG. 2 illustrates a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 2, a communications system 200 in accordance with the present invention is illustrated. The communications system 200 includes a host transceiver 205 and a user transceiver 210 capable of communicating with each other over a connection 215. The connection 215 may be either a wire-line connection or a wire-less connection, depending on the application. Generally, the host and user transceiver 205, 210 communicate with each other using a common communications protocol (i.e., a communications standard such as DECT, PHS, NETBIOS, TCP/IP, etc.) that defines the transmission parameters, such as the format of data to be transmitted, error checking algorithm, retransmission scheme, and the like. In one embodiment, the host and user transceivers 205, 210 may be a pair of modems or fax machines. In an alternative embodiment, the host transceiver 205 may be a base station for a cellular telephone network or a WLL network, and the user transceiver 210 may be a cellular telephone of the cellular telephone network or a wireless subscriber unit (WSU) of the WLL network.

Figure 3:
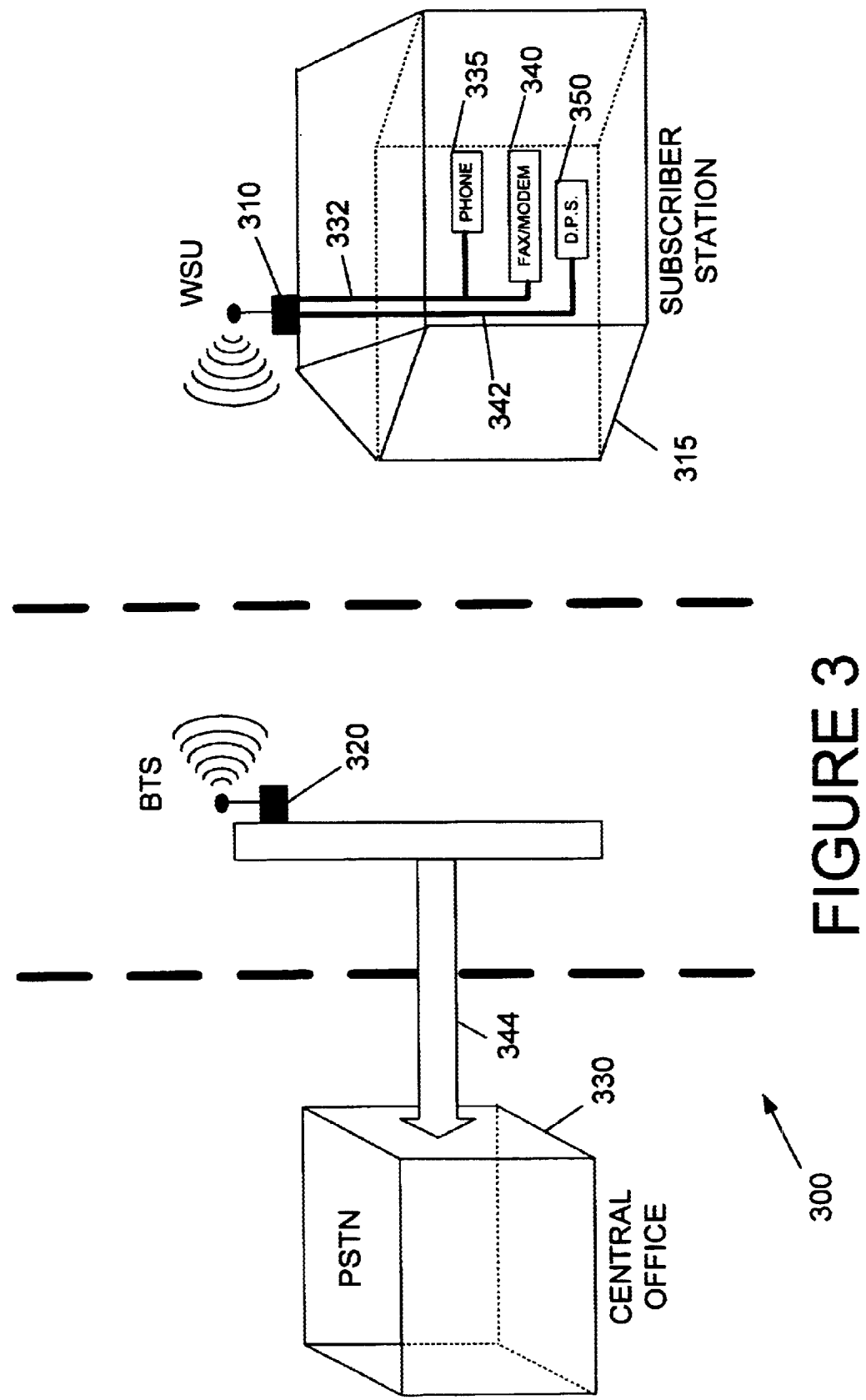
FIG. 3 illustrates a block diagram of a WLL network in accordance with the present invention.

FIG. 3 illustrates a stylized block diagram of an alternative embodiment of a communications system 300 in accordance with the present invention. Specifically, the communications system 300 in the illustrated embodiment is a WLL network 300, where the user transceiver 210 is a Wireless Subscriber Unit (WSU) 310 located at a subscriber station 315, and the host transceiver 205 is a remote Basestation Transceiver System (BTS) 320. The BTS 320 links the WSU 310 to a central office 330, thus allowing a user at the subscriber station 315 to communicate with other subscriber stations (not shown) through the central office 330. In the illustrated embodiment, the WSU 310 is capable of supporting voice and/or data communications. Specifically, the WSU 310 supports a single analog line 332 for a telephone 335 or a modem 340 to use, as well as a data line 342 for providing packet switched data access to a data processing system 350. In some cases the data line 342 can be removed and data can be modulated to share the same line 332 as that used for voice. This requires a specialized data modem (not shown) within the WSU 310 and data processing system 350. A connection 344 between the BTS 320 and the central office 330 may be made via a wire-line, fiber or microwave link, depending on the bandwidth, distance, and the terrain.

One popular WLL protocol is the DECT protocol, which is based on a micro-cellular radio communication system that provides low-power radio (cordless) access, at least as it pertains to the WLL network 300, between the WSU 310 and the BTS 320 at ranges up to a few hundred meters. The DECT protocol is described in the European Telecommunications Standard, ETS 300 175 (Parts 1 through 9) (1996), entitled "Radio Equipment and Systems (RES); Digital Enhanced Cordless Telecommunications (DECT); Common Interface (CI)," which is incorporated herein by reference in its entirety. Other pertinent DECT protocol references include ETR 185, entitled "Radio Equipment and Systems (RES); Digital European Cordless Telecommunications (DECT); Data Services Profile (DSP); Profiles Overview"; ETS 300 765-1, ETS 300 765-2, entitled "Radio Equipment and Systems (RES); Digital European Cordless Telecommunications (DECT); Radio in the Local Loop (RLL) Access Profile (RAP); Part 1: Basic telephony services"; ETS 300 765-2, entitled "Radio Equipment and Systems (RES); Digital European Cordless Telecommunications (DECT); Radio in the Local Loop (RLL) Access Profile (RAP); Part 2: Advanced telephony services"; Draft EN (reference number not yet assigned), V0.0.1 (1998-11), entitled "Digital European Cordless Telecommunications (DECT); Data Services Profile (DSP); DECT Packet"; EN 300 435, entitled "Radio Services (DPRS) Digital European Cordless Telecommunications (DECT); Data Services Profile (DSP); Base standard including inter-working to connection-less networks (Service types A and B, class 1)"; and EN 300 651, entitled "Digital European Cordless Telecommunications (DECT); Data Services Profile (DSP); Generic data link service (service type C, class 2)," which are incorporated herein by reference in their entirety. Exemplary technical characteristics of the DECT protocol are shown below in Table 1.

TABLE 1

Technical Characteristics for DBCT protocol

| | |
|---|---|
| Frequency Band | 1880–1900 MHz |
| Number of Carriers | 10 |
| Carrier Spacing | 1.728 MHz |
| Peak Transmit Power | 250 mW |
| Carrier Multiplex | TDMA; 24 slots per frame |
| Frame Length | 10 ms |
| Basic Duplexing | TDD using 2 slots on same RF carrier |
| Gross Bit Rate | 1152 kbit/sec |
| Net Channel Rates | 32 kbit/sec B-field (traffic) per slot |
| Packet Data (effective bit rate) | 552 kbit/sec |

Figure 4:
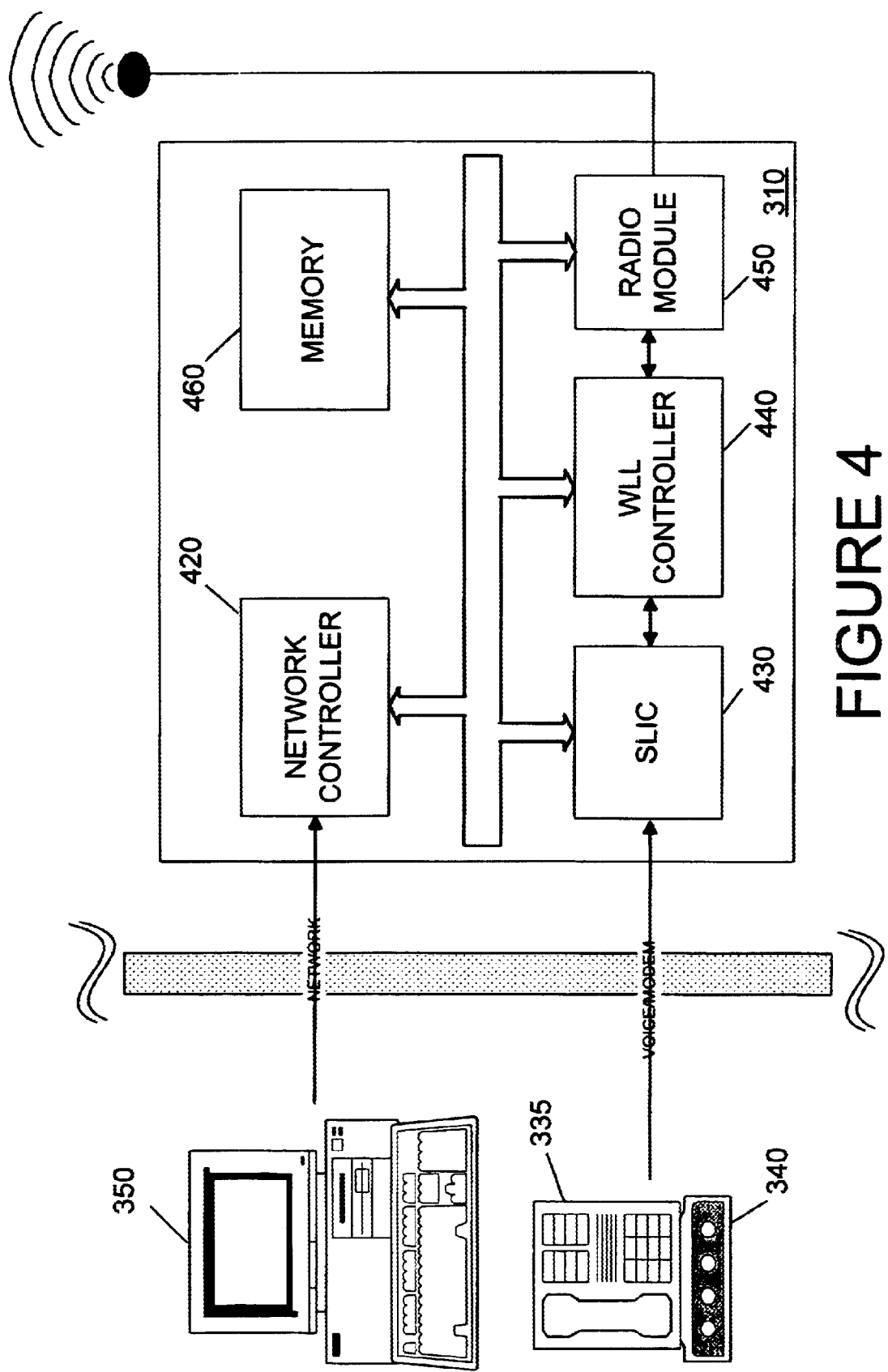
FIG. 4 depicts a Wireless Subscriber Unit of the WLL network of FIG. 3 in accordance with the present invention.

FIG. 4 illustrates a stylized block diagram of one embodiment of the WSU 310 in accordance with the present invention. The data processing system 350, the phone 335, and the modem 340 provide packet data, voice data, and modem data, respectively, to the WSU 310, which then transmits the data to the BTS 320. The data processing system 350 is capable of providing packet data to a network controller 420 of the WSU 310 through a network card (not shown), such as a token ring card, an Ethernet card, a PCnet card, and the like. A Subscriber Line Interface Circuit (SLIC) 430 of the WSU 310 provides the voice/modem 335, 340 interface. A WLL controller 440 formats the packet, voice, and modem data according to the DECT protocol and then interfaces to a radio module 450 for transmission and reception. Similarly, the WLL controller 440 is also responsible for processing received DECT frames, decoding and storing protocol messages, and directing the user information to an appropriate destination.

The packet data is provided by the data processing system 350 to the network controller 420, which formats the packet data into smaller sized protocol data units (PDUs) and stores the PDUs in an external memory 460 of the WSU 310. The external memory 460 acts as a buffer to the WLL controller 440 because the WLL controller 440 is generally unable to transmit the packet data at the rate the data is provided to the WLL controller 440 by the data processing unit 350. Accordingly, the PDUs are stored in the external memory 460 by the network controller 420, and later retrieved by the WLL controller 440 for transmission on an as needed basis.

The DECT protocol currently defines packet data support as standard U-plane service. LU2 class 1 with Medium Access Control (MAC) layer $I_p$ error correction (commonly referred to as MOD2-ARQ). The Data Link Control (DLC) layer U-plane utilizes the $I_p$ channel with the protected mode MAC layer procedure. The protection mode specified is the modulo-2 $I_p$ retransmission scheme for the forward channels and error detection based on the acknowledgement provided by a reverse bearer. There are two types of data bearers, a duplex and double simplex bearer. The flow of data in a duplex bearer slot is bi-directional, while the flow of the data for double simplex bearers is unidirectional.

FIG. 5a illustrates a DECT (TDMA) frame 500 that may be utilized by the present invention. The frame 500 is of a 10 millisecond duration and is divided into 24, grouped as twelve receive and twelve transmit slots. FIG. 5b illustrates one slot 504 of the frame 500. The slot 504 of the frame 500 includes a first guard band 505, an S-field 507, an A-field 509, a B-field 510, an X and Z field 512, 514, and a second guard band 516. FIG. 5c illustrates a more detailed diagram of the B-field 510 that is utilized for transferring packet data in the protected mode. Specifically, the B-field 510 of the frame 500 includes four sub-fields 530(a–d) (hereinafter referred to as "data fields"), wherein a corresponding error detection field 535(a–d) protects each data field 530(a–d). Although not so limited, in the illustrated embodiment, the error detection fields 535(a–d) are Cyclic Redundancy Code (CRC) fields. Cyclic redundancy checking is a method of checking for errors in data that has been transmitted on a communications link. The sending device (i.e. either the WSU 310 or BTU 320) applies a 16- or 32-bit polynomial to each data field 530(a–d) that is to be transmitted and appends the resulting cyclic redundancy code (CRC) to each data field 530(a–d). The receiving end (i.e., either the WSU 310 or BTU 320) applies the same polynomial to the data and compares its result with the result appended by the sender. If they agree, the data within the data fields 530(a–d) has been received successfully. If not, the sender can be notified to retransmit the data. The data fields 530(a–d) hold packet data that is transferred to and from the WSU 310, and the CRC fields 535(a–d) are utilized to determine the integrity of the packet data stored in the data fields 530(a–d). Each data field 530(a–d) in the illustrated embodiment, as defined by the ETSI, comprises 64 bits, and each CRC field 535(a–d) comprises 16 bits. The terms "field" and "data field," as utilized herein, refer to at least a portion of the frame 500, and thus may include one or more bits of the frame 500.

It is contemplated that the present invention is applicable to a variety of communications systems employing TDMA technology. However, for illustrative purposes, the present invention is described with respect to the DECT TDMA frame 500.

The functionality of the WLL controller 440 may be controlled by software, hardware, or any combination thereof. Although not so limited, in the illustrated embodiment, the software handles the higher levels of functionality that include portions of the Medium Access Control (MAC) layer, the Data Link Control (DLC) layer. The software may also perform other control functions for the WLL controller 440, such as defining the modes of operation, ascertaining the slots and frequencies that are to be utilized, and determining the timing configurations for the radio control signals.

The present invention includes implementing certain functions of the WLL controller 440 in hardware, especially functions where real time operation is desirable. For example, and as is described in more detail below, a method of transferring data from the memory 460 to an internal memory of the WLL controller 440 is implemented primarily in hardware to increase the data throughput between the WSU 310 and BTS 320.

Figure 6:
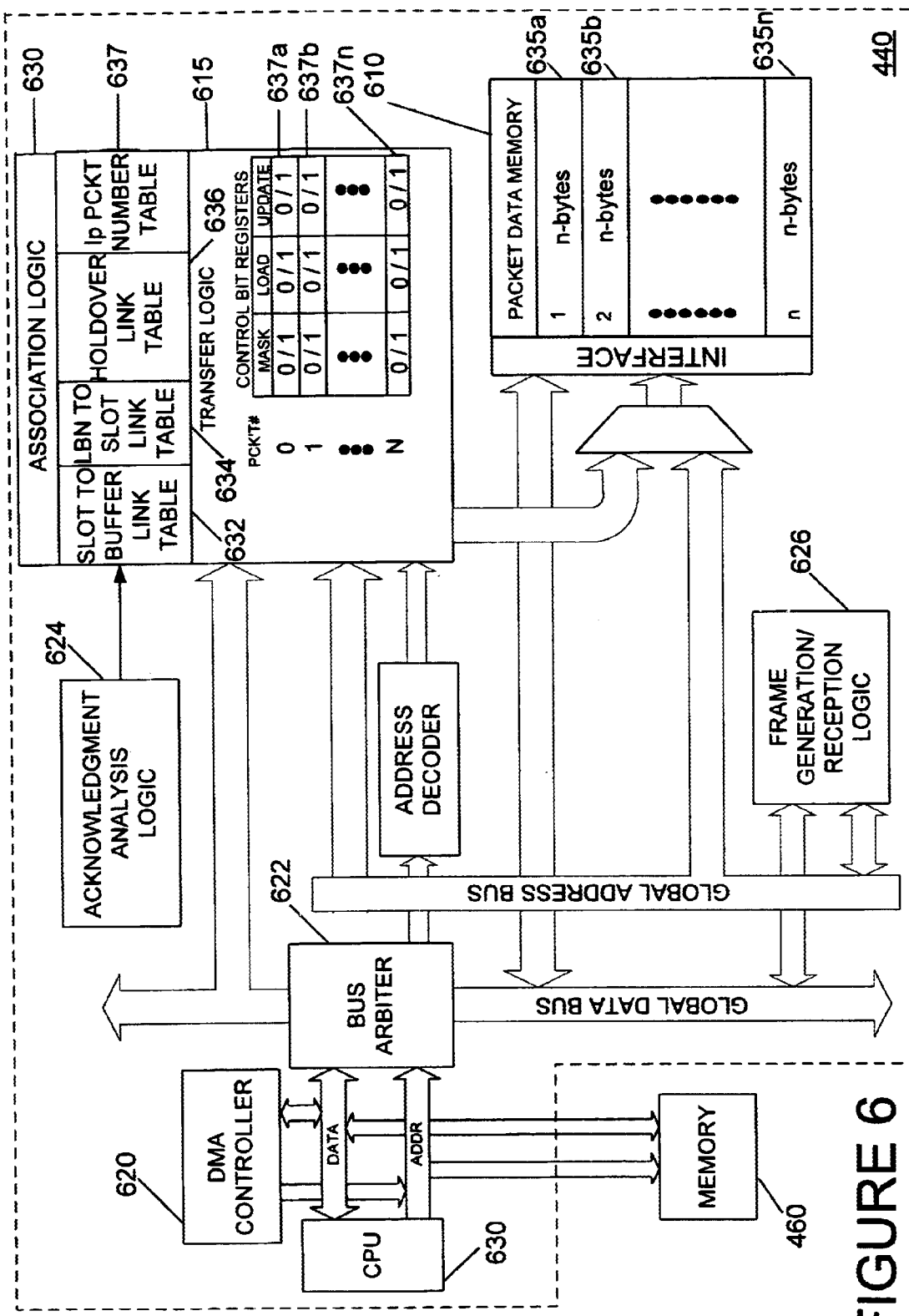
FIG. 6 illustrates a stylized block diagram of the Wireless Subscriber Unit of FIG. 4 in accordance with the present invention.

FIG. 6 illustrates a stylized block diagram of the WLL controller 440 in accordance with the present invention. In the interest of clarity and to avoid obscuring the invention, only that portion of the WLL controller 440 that is helpful in understanding the invention is illustrated. More specifically, FIG. 6 illustrates a portion of the WLL controller 440 that may be utilized for transmission and reception of packet data. The WLL controller 440 includes a transfer logic 615, which is capable of moving blocks of data from the external memory 460 to an "on-chip" packet data memory 610 without a need of continuously reprogramming a direct memory access ("DMA") controller 620 by a CPU 630 of the WLL controller 440. A bus arbiter 622 is provided to allow both the CPU 630 and the transfer logic 615 via the DMA controller 620 to access the packet data memory 610. The WLL controller 440 includes acknowledgement-analysis logic 624 as well as frame generation/reception logic 626. The frame generation/reception logic 626 generates frames 500 using at least a portion of the data stored in the packet data memory 610 and transmits the frames 500 to the peer station. The frame generation/reception logic 626 extracts and stores data in the packet data memory 610 from the frames 500 that are received from the peer station.

Generally, each frame 500 transmitted from the peer station includes an acknowledgement of an earlier transmission by the WSU 310. The acknowledgement-analysis logic 624 of the WLL controller 440 analyzes acknowledgements transmitted by the peer station. Acknowledgements are received in an active packet data receive slot (i.e., a reverse bearer) of the frame 500. Acknowledgements for double simplex bearers are received in a MAC-MOD2-ACK message, on a logic bearer number (LBN) basis. Specifically, the acknowledgements for double simplex bearers reside in at least one of the data fields of B-field 510 of the frame 500, as shown in FIG. 7a. The acknowledgement for the duplex bearers is received in the A-field 509 (see FIG. 5b) of the frame. As will be described in more detail below, the acknowledgement-analysis logic 624 utilizes association logic 630, which, in one embodiment, comprises at least one of slot to buffer link table 632, LBN to slot link table 634, handover link table 636, and slot to $I_p$ packet number link table 637 to analyze acknowledgements transmitted by the peer station. In accordance with present invention, the WLL controller 440 utilizes the association logic 630 to quickly and efficiently analyze the acknowledgements and to prioritize the transmission of data such that bandwidth is preserved.

As can be seen in FIG. 7a, the MAC-MOD2-ACK messages for the double simplex bearers may occupy at least one of the data fields (e.g. the data field 530(a) shown in FIG. 7a) of the B-field 510 of the frame 500 (i.e., bits through 63 of a data field). A double simplex bearer comprises two bearers. The two bearers are typically 12 slots apart (e.g., $1^{st}$ and $13^{th}$ slots), and share a common LBN. However, despite having a common LBN, each bearer of the double simplex bearer has its own acknowledgement. For example, the acknowledgement of the first bearer of a double simplex bearer is received in the first portion 700 of the data field 530(a), as shown in FIG. 7b. The acknowledgement of the second bearer of a double simplex bearer is received in the second portion 710 of the data field 530(a), as shown in FIG. 7c.

Referring back to FIG. 6, the transfer logic 615 is capable of transferring data from the external memory 460 to an "on-chip" memory (hereinafter referred to as "packet data memory") 610 of the WLL controller 440. Specifically, transfer logic 615 is capable of moving blocks of data from the external memory 460 to an "on-chip" packet data memory 610 without a need of continuously reprogramming a direct memory access ("DMA") controller 620 by a CPU 630 of the WLL controller 440. Once the data is transferred from the external memory 460 to the packet data memory 610, the data stored in the packet data memory 610 is transferred to the radio module 450 for transmission to its counterpart, the BTS 320 (see FIG. 3). The description hereinafter relates to transmission of data in an uplink connection (i.e., transfer from the WSU 310 to BTS 320), however, it is contemplated that the present invention is equally applicable in a downlink connection (i.e., transfer from the BTS 320 to the WSU 310).

The DECT retransmission scheme for the packet data transmission sometimes requires that a variable amount of data be moved from the external memory 460 to the packet data memory 610. This is due to the fact that data from earlier frames 500 may occasionally need to be retained in the packet data memory 610 for retransmission and thus cannot be overwritten by new data. The transfer logic 615 is capable of determining the amount of new data that is required for every frame from the external memory 460, initiating the transfer from the external memory 460 to the packet data memory 610 using the DMA controller 620, and then terminating the DMA transfer.

The packet data memory 610 can be any of a variety of single-ported or multi-ported memory known to the art, including static random access memory (SRAM), dynamic random access memory (DRAM), flash, or any other programmable memory. In the illustrated embodiment, the packet data memory 610 is a dual-port memory comprising a plurality of buffers 635(a–n). It is contemplated that the size and type of the memory 610 employed may vary from one implementation to another. A dual-port memory 610 allows a simultaneous read and write access to the packet data memory 610. The buffers 635(a–n) of the packet data memory 610 are utilized to store data that is transmitted, as well as for data that is received. In this particular implementation, the packet data memory 610 includes twenty-four 32-byte buffers that correspond to the number of time slots 504 of the DECT frame 500 and the amount of user data carried in each slot 504. Thus, there is a corresponding buffer 635(a–n) for each time slot 504. It should be noted that although there is a one-for-one correspondence of slots 504 to buffers 635(a–n), a slot 504 can be assigned to any one of the buffers 635(a–n). The software, in one embodiment, identifies the buffers 635(a–n) that will be utilized for transmission/reception of packet data. As will be described below, the slot to buffer link table 632 may serve a multitude of purposes, including tracking slot 504 to buffer 635(a–n) association.

The transfer logic 615 of the WLL, controller 440 includes a plurality of control bit registers 637(a–n), wherein each buffer 635(a–n) of the packet data memory 610 has a corresponding control bit register 637(a–n). Each control bit register 637(a–n) comprises a plurality of control bits for configuring the packet data memory 610. Although the present invention employs a control bit register 637(a–n) in conjunction with control bits to configure the packet data memory 610, it is contemplated that other means may also be employed to configure the packet data memory 610.

Those skilled in the art will appreciate that the number and type of control bits employed is implementation specific. In the illustrated embodiment, a mask bit, a load bit, and an update bit are utilized. Mask bits identify the buffers 635(a–n) of the packet data memory 610 that will be utilized for data transfer. For example, if the mask bits of the first and second control bit registers 637a, 637b are set to zero, and the mask bits for the remaining control bit registers 637(c–n) are set to one, then only the first and second buffers 635a, 635b of the packet data memory 610 are utilized to transmit data. Accordingly, only the first and second buffers 635a, 635b of the packet data memory 610 are employed to store data that is retrieved from the external memory 460 for transmission. In the illustrated embodiment, the mask bits allow the size of the packet data memory 610 that is employed to transmit data to be configurable, as well as allow the buffers 635(a–n) to be non-contiguous. The load bits identify which "masked" buffers 635(a–n) (i.e., buffers having the mask bit set to zero) of the packet data memory 610 require new data. For instance, referring to the above example, if the load bits of the first and second buffers 635a, 635b are one and zero, respectively, then only the second buffer 635b requires new data. In the illustrated embodiment, the load bits allow the transfer logic 615 to fetch a variable amount of data from the external memory 460 without the intervention of the CPU 630, as described in more detail below. The update bits identify the buffers 635(a–n) from which the data has been extracted and transmitted to the BTS 320.

As mentioned earlier, the acknowledgements for double simplex bearers are received in a logic bearer number (LBN) format. However, data is transmitted and received on a slot-by-slot basis, wherein each slot has at least one corresponding buffer 635(a–n). Accordingly, it is desirable for the acknowledgement-analysis logic 624 to match each LBN to its corresponding slot to determine which buffer or buffers 635(a–n) need updating. The acknowledgement-analysis logic 624 analyzes the acknowledgement bearer and then, based on the results of an earlier transmission, updates the load bit in the control bit registers 637(a–n). The acknowledgement-analysis logic 624 utilizes the LBN to slot link table 634 to ascertain a corresponding slot 504 for each LBN. The slot to buffer link table 632 is then utilized to associate each slot 504 to a corresponding buffer 635(a–n) in the packet data memory 610. The association of slot 504 to a particular buffer 635(a–n) is desirable to allow the acknowledgement-analysis logic 624 to update the load bit in the control bit registers 637(a–n).

FIG. 8 illustrates one embodiment of the slot to buffer link table 632. Although not so limited, the slot to buffer link table 632 includes at least one field for each slot 504 of the frame 500. Each "slot" field has three corresponding fields: packet data active field, carrier type field, and packet data buffer field. The "packet data active" field identifies whether the corresponding slot 504 is being utilized for transmission of packet data. The acknowledgement field of the reverse bearer does not identify the active LBNs and, so, the "packet data active" field of the slot to buffer link table 632 provides a quick and efficient means for ascertaining the LBNs that are active. The "packet data active" field, for example, may include a binary digit 1 or 0 to indicate whether the corresponding slot is being utilized for transmitting packet data. The "carrier type" field identifies the type of carrier associated with that slot 504, such as a full duplex bearer, double simplex bearer, and the like. The "packet data buffer" field of each slot 504 identifies the buffer 635(a–n) that is associated with that particular slot 504. The "packet data buffer" includes at least a portion of the memory address of each buffer 635(a–n) to identify the buffer 635(a–n). It should be noted that when processing a reverse bearer, which occurs between slots 0 and 11, that the transmit portion of the duplex bearer will be 12 slot offset. For example, if a duplex reverse bearer is on slot 5, then the transmitting portion of the duplex bearer will be on slot 17 (i.e., 5+12).

The slot to buffer link table 632 is generally initialized before the communication between the WSU 310 and BTS 320 commences. That is, the slot to buffer link table 632 is updated once the WLL controller 440 of the WSU 310 ascertains the slots 504 and frequencies that will be utilized during communications with the BTS 320. Accordingly, the number of slots 504 that are dedicated for transmitting packet data will determine, at least initially, the number of packet data buffers 635(a–n) that need to be allocated. Additional buffers 635(a–n) may be allocated during bearer handover.

FIG. 9 illustrates one embodiment of the LBN to slot link table 634, which allows for a quick and efficient method for associating each LBN to a corresponding slot 504 of the frame 500. The association of LBNs to the corresponding slots 504 is desirable because the acknowledgement received from the peer station is based on an LBN basis, and not slot basis. Accordingly, in accordance with the present invention, the LBN to slot link table 634 provides a quick and efficient method for converting LBNs to slot values. Although not so limited, the LBN to slot table link table 634 illustrated in FIG. 9 includes fourteen LBN fields for the first and second half of the frame 500. Each LBN field has a corresponding slot number. Those skilled in the art will appreciate that the LBN to slot link table 634 may contain additional entries or fields without departing from the spirit of the invention. Additionally, the number of LBN fields in the LBN to slot link table 634 may vary depending on the application.

In one embodiment of the present invention, the LBN to slot link table 634 is automatically updated every time the slot to buffer link table 632 is revised. That is, the LBN to slot slink table 634 acts similar to a shadow register in that it monitors the bus and extracts, formats, and organizes information from the bus in a manner that requires little intervention from the software.

Figure 10:
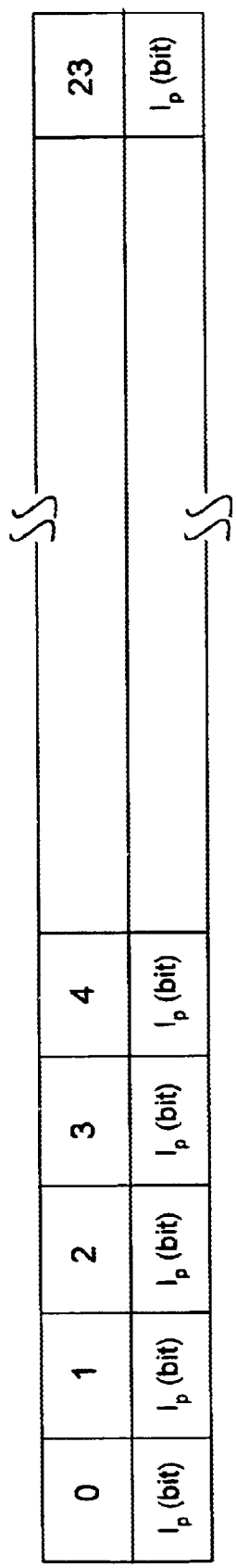
FIG. 10 depicts an embodiment of a slot to $I_p$ packet number link table that may be utilized by the Wireless Subscriber Unit of FIG. 6.
Figure 11:
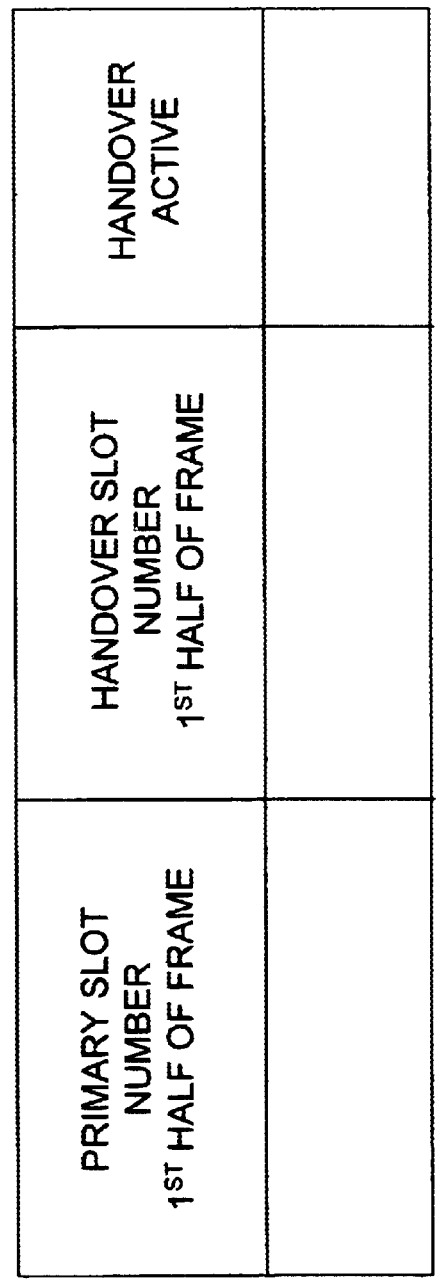
FIG. 11 depicts an embodiment of a handover link table link table that may be utilized by the Wireless Subscriber Unit of FIG. 6.

The $I_p$ retransmission scheme utilizes a two-state packet number scheme, wherein the packet number toggles between 1 and 0 for successive new packets. The packet number does not change in case of an unsuccessful retransmission. In the illustrated embodiment, although not so limited, the $I_p$ packet numbers are maintained in slot to $I_p$ packet number link table 637 on a slot basis for both uplink and downlink connections. One embodiment of the slot to Ip packet number link table 637 is illustrated in FIG. 10. One bit is provided in the slot to Ip packet number link table 637 for each slot 504, where the bit represents the current packet number for the bearer associated with that slot 504. The slot to Ip packet number link table 637 may be accessed by the software.

Generally, a packet data connection consists of multiple bearers. When errors are detected in a particular bearer, a decision may be made to move the bearer to a different slot 504. This can be accomplished using bearer handover or bearer replacement. In both situations, the data in a particular packet data is transmitted for a period of time on two slots 504. In the case of bearer replacement, data in one buffer 635(a–n) is transmitted on two slots 504, each with a different LBN. When the acknowledgement is received, a common decision is made which considers both LBN acknowledgements. The LBN to slot link table and slot to buffer link table 632, 634 are used to identify the common buffer 635(a–n) and hardware updates the load bit. In the case of handover, a second slot 504 is set up to transmit the same data on two slots 504, but this is considered to be the same bearer and has the same LBN. The same data is transmitted on two slots 504, and therefore, although the same bearer, separate variables are maintained for each slot 504. The requirement is that based upon the LBN acknowledgement received and current status of the bearer, the hardware will decide to advance, retransmit, or jump. Since both slots are really the same bearer, they must also have the same packet number which is maintained on a slot by slot basis. The slot to Ip packet number link table 637 and handover link table 636 are used to perform a common update of this variable during handover. The handover link register table defines the primary slot, handover slot, and a bit which indicates an handover is in progress.

In accordance with the present invention, the transfer logic 615 of the WLL controller 440 is capable of transferring data from the external memory 460 to the packet data memory 610 without the real-time intervention of the central processing unit 630. The WLL controller 440 employs a method of FIG. 12 to accomplish the data transfer from the external memory 460 to the packet data memory 610. The method of FIG. 12 begins at block 710, where the control bit registers 637(a–n) and the DMA controller 620 are initialized. The initialization process is illustrated in FIG. 13. At block 810, the control bit registers 637(a–n) are initialized by setting the mask bits of the buffers 635(a–n) of the packet data memory 610 that are to be utilized for the packet data asymmetric connection to zero. At block 820, the load bits for the unmasked buffers 635(a–n) are set to zero to indicate that the unmasked buffers 635(a–n) need new data, and the update bits are set a value of one to indicate that the contents of the unmasked buffers 635(a–n) have not yet been extracted and transmitted to the BTS 320. At block 830, the source address pointer of the DMA controller 620 is programmed to point to the relevant address in the external memory 460. The source address pointer of the DMA controller 620 is programmed to increment following every transfer. At block 840, the destination address pointer of the DMA controller 620 is programmed to point to a transfer logic register 615 that specifies a starting location for storing data in the packet data memory 610. The destination address pointer of the DMA controller 620 is programmed such that it does not increment following every transfer.

Referring back to FIG. 12, after the initialization process of the block 710 is complete, at block 720, the transfer logic 615 determines the 32-byte boundaries (starting with the initial address) of the buffers 635(a–n) of the packet data memory 610. The boundaries are identified by the transfer logic 615 for two primary reasons: First, to determine if a buffer (32-byte segment) 635(a–n) needs to be skipped while data is being transferred from the external memory 460. A buffer 635(a–n) is skipped if either its corresponding mask or load bit is set to one. Second, to determine if a buffer pointer has wrapped around (i.e., the buffer pointer is past the last unmasked buffer 635(a–n)). The transfer logic 615 ensures that the buffer pointer points to the next unmasked buffer 635(a–n) that is available for storing data.

At block 730, the arrival of a reverse bearer is detected. A reverse bearer, in an uplink connection, for example, generally provides an acknowledgement to the WSU 310 from the BTS 320, indicating whether the transmission was successful or not. In response to detecting the reverse bearer, at block 740, an acknowledgement analysis is performed on a slot-by-slot basis of the data transmitted during an earlier frame. That is, as per DECT protocol, the reverse bearer from the BTS 320 provides an acknowledgement of an earlier transmission, wherein the reverse bearer indicates, on a slot-by-slot basis, which data successfully reached the BTS 320. Because it is necessary to perform the acknowledgement analysis of the block 740 for only those buffers 635(a–n) for which the data was transmitted, the acknowledgement data for only those buffers 635(a–n) having an update bit equal to zero are analyzed. During the acknowledgement analysis at the block 740, the buffers 635(a–n) whose mask bits are equal to zero and whose update bits are equal to zero are identified. The load bits for these identified buffers 635(a–n) are set to zero, if the corresponding transmission was successful. Accordingly, if the transmission was successful for unmasked buffers 635(a–n) having an update bit of zero, then the corresponding load bits of these buffers 635(a–n) are set to zero, indicating that these buffers 635(a–n) need new data.

At block 745, the transfer logic 615 determines if at least one buffer 635(*a–n*) is available for receiving data. That is, the transfer logic 615 searches the packet data memory 610 and identifies an unmasked buffer 635(*a–n*) having an associated load bit equal to zero. If at least one buffer 635(*a–n*) is available, then, at block 750, the transfer logic 615 begins to transfer the new data from the external source to the available buffers 635(*a–n*). If no buffer 635(*a–n*) is available to receive the new data (i.e., all the buffers are full), then the step of block 750 is skipped. As will be described in more detail below, the transfer logic 615 initiates a DMA transfer from the external memory 460 by asserting a data request (DRQ). Once the buffers 635(*a–n*) are loaded with new data, at block 760, the WLL controller 440 of the WSU 310 transmits the data to the BTS 320.

At the block 750, the transfer logic 615 initiates a DMA transfer substantially immediately following the reception and processing of a reverse bearer, provided that at least one of the buffers 635(*a–n*) is free to receive new data. In accordance with the present invention, the transfer logic 615 transfers data from the external memory 460 to the packet data memory 610 based on a priority scheme. That is, as is described in more detail in FIG. 14, the priority scheme, in one embodiment, calls for retrieving data into buffers based on the order the slots 504 are transmitted within a frame 500. For example, assuming the acknowledgement is received on a reverse bearer in slot 5, the transfer logic 615 starts from slot 6, the next active slot, for example, to see if the buffer 635(*a–n*) corresponding to slot 6 needs to be loaded with new data. If yes, the buffer 635(*a–n*) corresponding to slot 6 is loaded with new data. If not, the next slot (i.e.. slot 7) is checked. The above process continues for the remaining slots 504 of the frame 500 until all of the slots 504 up to the reverse bearer slot have been checked.

Figure 14:
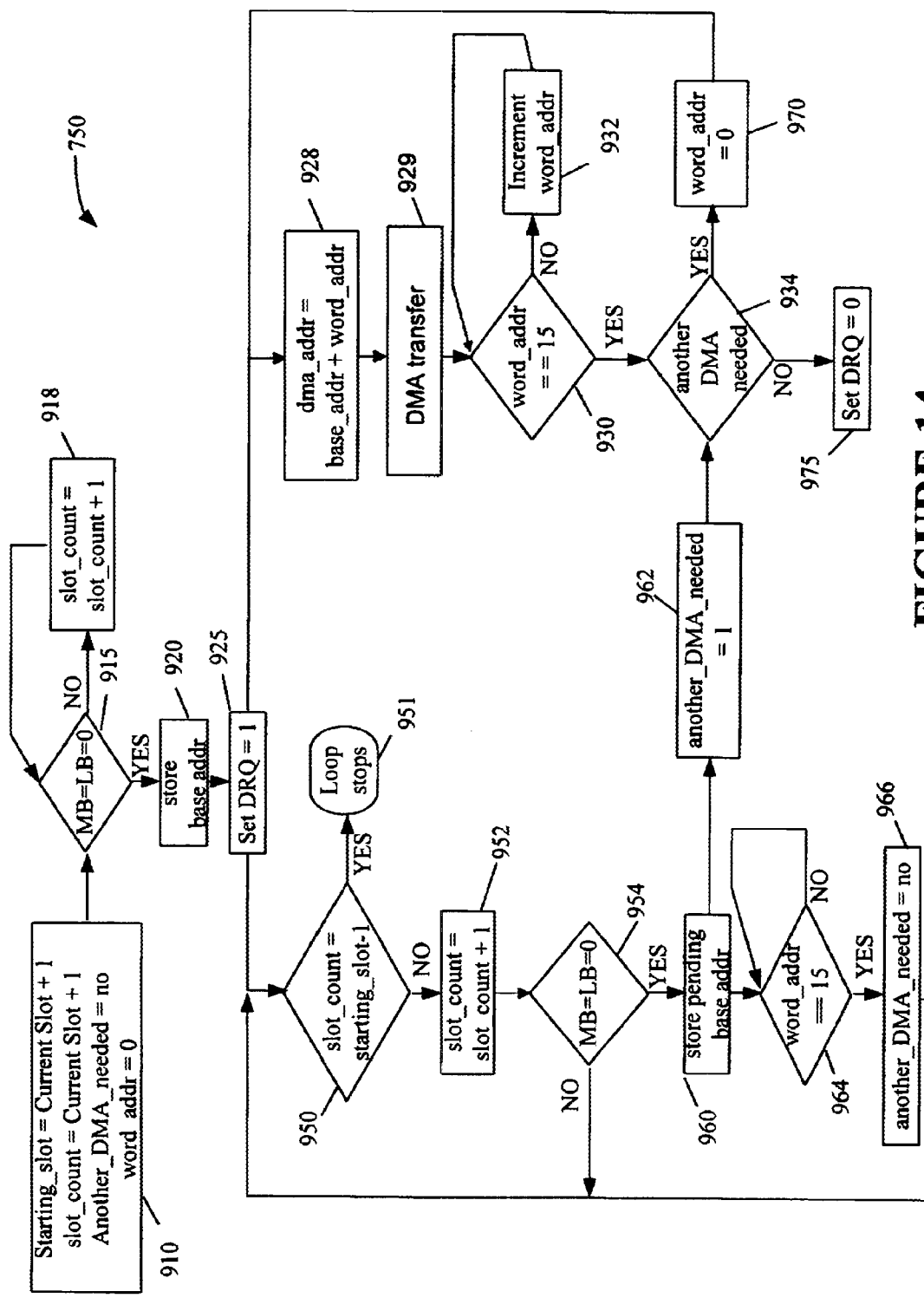
FIG. 14 illustrates a method in accordance with the present invention that can be employed by the Wireless Subscriber Unit illustrated in FIG. 6.

The method of FIG. 14 illustrates the loading of data from external memory 460 to the packet data memory 610. At block 910 of FIG. 14, several variables are initialized. such as "starting_slot," "slot_count," "another_DMA_needed," and "word_addr." The starting_slot variable is utilized as a reference point to identify when all of the buffers 635(*a–n*) corresponding to the slots 504 of the frame 500 have been analyzed. The slot_count variable is utilized as a pointer to step through the slots 504 of the frame 500 until the slot 504 identified by the starting_slot variable (i.e., reverse bearer slot) has been reached. Initially, the starting_slot and slot_count variables point to the next slot 504 after the reverse bearer slot 504. The another_DMA_needed variable is used as a flag to indicate whether a buffer 635(*a–n*) of the packet data memory 610 needs new data. The word_addr variable is utilized as a counter to ensure that a particular buffer 635(*a–n*) has been completely loaded. In the illustrated embodiment, although not so limited, because of the size of each buffer 635(*a–n*) is 32 bytes, the word_addr is reset after 16 iterations.

At block 915, the transfer logic 615 analyzes the mask and load bits of the buffer 635(*a–n*) corresponding to the slot 504 identified by the slot_count variable (hereinafter also referred to as the "current buffer"). At the block 915, the slot_count variable points to the slot 504 after the reverse bearer slot (i.e., see block 910). The transfer logic 615 utilizes the slot to buffer link table 632 to associate slots 504 to corresponding buffers 635(*a–n*). If at the block 915 the mask and load bits of the buffer 635(*a–n*) corresponding to the slot 504 identified by the slot_count variable are not zero, then the slot_count variable is incremented to point to the next slot 504. A mask bit of a zero indicates that the corresponding buffer 635(*a–n*) of the packet data memory 610 is being utilized to transfer data, and a load bit of zero indicates that the corresponding buffer 635(*a–n*) needs to be loaded with new data. Thus, if both mask and load bits of a buffer 635(*a–n*) are zero, then, at the block 910, additional data must be retrieved and stored in the buffer 635(*a–n*). On the other hand, if both the mask and load bits are not equal to zero, then, at block 915, either the buffer 635(*a–n*) is masked off or the buffer 635(*a–n*) contains data that has not been acknowledged. Accordingly, if the mask bit and load bits of a buffer 635(*a–n*) are not equal to zero, then that buffer 635(*a–n*) needs no servicing and the slot_count variable is incremented until a slot 504 is found that has a corresponding buffer 635(*a–n*) that needs new data. Once the buffer 635(*a–n*) is found having a mask and load bits of zero, at block 920, at least a portion of the address of the buffer 635(*a–n*) is stored in a register (not shown) for later use.

At block 925, a DRQ is asserted and two separate, yet substantially simultaneous, processes are spawned off. The first process handles a direct memory access request for a current buffer 635(*a–n*), while the second process searches for a next buffer 635(*a–n*) that needs servicing (e.g., needing new data). The second process is able to search for the next buffer 635(*a–n*) needing service because the second process operates faster than the first process. This is because the actual act of transferring data that occurs during the first process generally tends to be slower than the operations performed in the second process.

The steps of the first process are performed by blocks 928, 929, 930, and 932. At the blocks 928, 929, 930, and 932, the transfer logic 615 transfers new data from the external memory 460 to the buffer 635(*a–n*) referenced by the slot_count. At the block 928, the address for the DMA controller 620 is generated by adding the base address of the current buffer 635(*a–n*) plus an offset specified by the word_addr variable. At the block 929, a DMA transfer is initiated by the DMA controller 620, wherein new data is transferred from the external memory 460 and stored in the buffer 635(*a–n*) identified by the variable dma_addr. As indicated by the blocks 930 and 932, the DMA controller 620 for the current buffer 635(*a–n*) cycles through 16 different address. Each time the word_addr is incremented at the block 932, the DMA controller 620 initiates a DMA transfer and transfers data to the buffer 635(*a–n*) identified by the variable dma_addr, which is calculated at the block 928. Once the current buffer 635(*a–n*) is loaded, at block 934, the transfer logic 615 determines if there is another buffer 635(*a–n*) that needs to be serviced. Whether another buffer 635(*a–n*) needs servicing is determined by the second process, which, as mentioned above, searches for a next buffer 635(*a–n*) that needs servicing.

The steps of the second process begin at block 950, where it is determined whether the slot_count variable has reached the reverse bearer slot 504. The starting_slot, as mentioned above, points to the next slot 504 after the reverse bearer slot 504. If the slot_count, at the block 950, has not processed all the slots 504 up the reverse bearer slot, it means that additional slots 504 remain to be analyzed. Accordingly, at block 952, the slot_count is incremented to point to the next slot 504. If the slot_count, at the block 950, reaches the reverse bearer slot 504, then the second process, at block 951, terminates.

At block 954, the transfer logic 615 analyzes the mask and load bits of the buffer 635(*a–n*) corresponding to the slot 504 identified by the slot_count variable. The transfer logic 615 utilizes the slot to buffer link table 632 to associate the slot 504 identified by the slot_counter variable to its corresponding buffer 635(a–n). If the mask and load bits of the buffer 635(a–n) corresponding to the slot 504 that is identified by the slot_counter are not zero, then, at the block 950, the transfer logic 615 once again determines if the slot_count variable points to the reverse bearer slot 504. The slot_count variable continues to be incremented until the reverse bearer slot 504 has not been reached or the mask and load bits of the buffer 635(a–n) being analyzed equal zero. If the mask and load bits of the buffer 635(a–n) corresponding to the slot 504 that is identified by the slot_counter are zero, then, at block 960, the base address of that buffer 635(a–n) is stored in a register for later use, and, at block 962, the another_DMA_needed variable is set to yes. The second process, at block 964, waits until the first process finishes loading the current buffer 635(a–n). When the current buffer 635(a–n) has been loaded, the another_DMA_needed variable is set to no at block 966. The second process then loops back to the block 950.

The DRQ is de-asserted only when it is determined that no more buffers 635(a–n) of the slots 504 for a given frame 500 need servicing. If it is determined, at the block 934, that another buffer 635(a–n) needs servicing, the transfer logic 615 clears the word_addr variable, at block 970, and starts the data transfer for the buffer 635(a–n) starting at the address found in the second process block 960, plus a word address of zero. When no more buffers 635(a–n) of the slots 504 for a given frame 500 need servicing, then transfer logic 615 de-asserts the DRQ at block 975.

Figure 7:
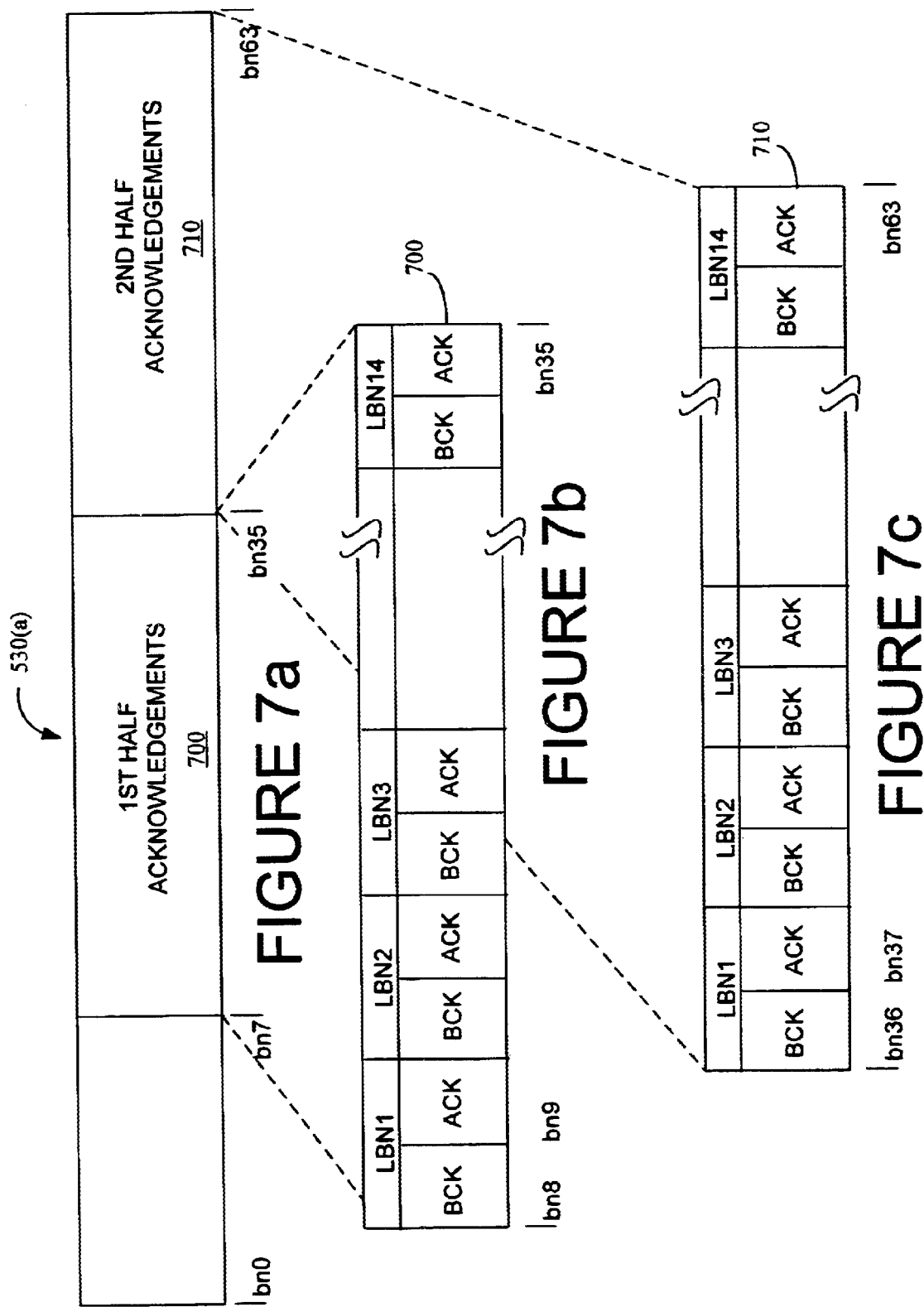
FIGS. 7a–c illustrate a portion of the DECT frame of FIG. 5a that includes the acknowledgements from the reverse bearer.
Figure 12:
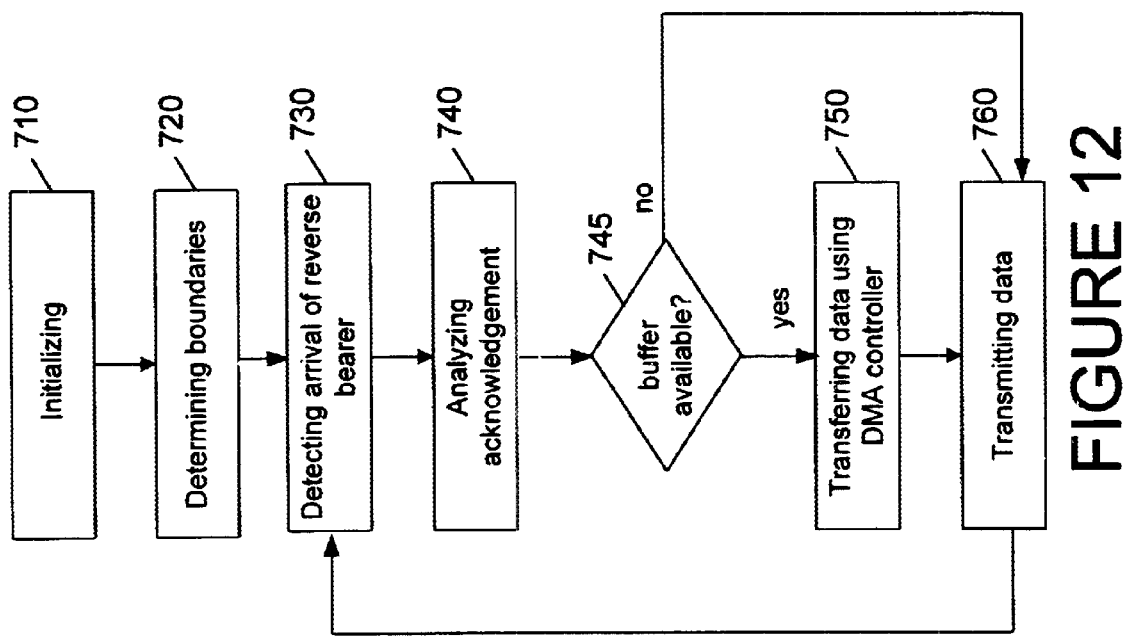
FIG. 12 illustrates a method in accordance with the present invention that may be employed by the Wireless Subscriber Unit illustrated in FIG. 6.
Figure 13:
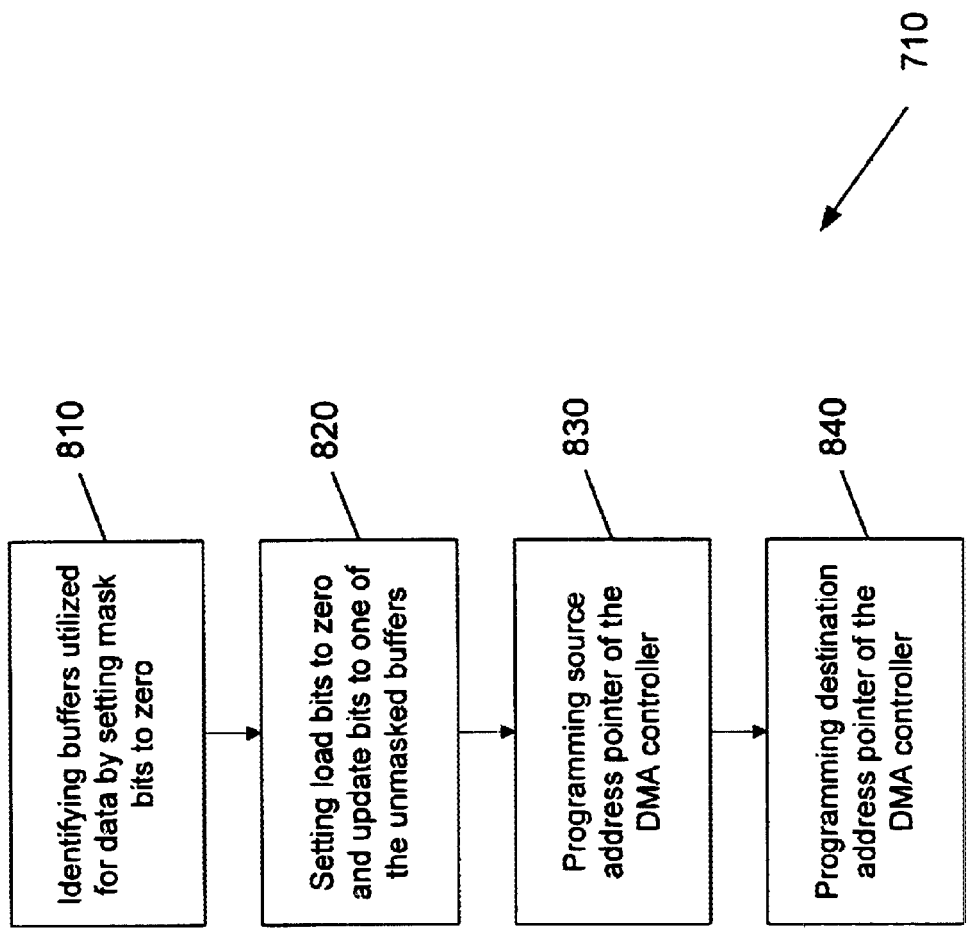
FIG. 13 illustrates a method in accordance with the present invention that may be employed by the Wireless Subscriber Unit illustrated in FIG. 6.

As can be seen with reference to FIGS. 7 and 12, the transfer logic 615, in conjunction with the mask and load bits, manages the transfer of varying amounts of data from the external memory 460 to the packet data memory 610. Additionally, the data transfer occurs in accordance with a priority scheme. In the illustrated embodiment, the priority scheme entails transferring data into the corresponding buffers 635(a–n) of the slots 504 sequentially after the reverse bearer slot 504. Accordingly, the priority scheme employed in the present invention ensures that new data will be fetched into buffers 635(a–n) in a timely manner after the detection of the reverse bearer slot 504. By making new data available to slots 504 (via the corresponding buffers 635 (a–n)) that follow the reverse bearer slot 504, the present invention improves the overall throughput of the communications system 200, 400, since there will be fewer empty slots 504 for a given frame transmission. Once the buffers 635(a–n) of the packet data memory 610 have been loaded with new data, the WLL controller 440 of the WSU 310 transfers the data to the BTS 320.

Although the present invention is described with reference to transferring data from the external memory 460 to the packet data memory 610, it is contemplated that the present invention is also employed for transferring data from the packet data memory 610 to the external memory 460 without a need of continuously reprogramming the DMA controller 620 before each data transfer. That is, the transfer logic 615, in conjunction with the mask and load bits, may also be capable of transferring varying amounts of data from the packet data memory 610 to the external memory 460 during a downlink connection. During a downlink connection, the data is received into the buffers 635(a–n) and eventually transferred from the unmasked buffers to the external memory 460. Because the process of transferring varying amounts of data from the packet data memory 610 to the external memory 460 in a downlink connection may be accomplished in a similar manner as described above for an uplink connection, such a process is not described in detail herein.

Those skilled in the art will appreciate that the above-described embodiments with respect to the WLL network 300 may also be pertinent with respect to other communications systems 200 (see FIG. 2) as well. Furthermore, although the present invention has been described with reference to communications systems 200, 300, the application of the present invention is not limited as such. It is contemplated that the application of the present invention may be extended to other technologies as well, including, but not limited to, data processing systems and other electronic devices where quick access to information is desirable.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
defining a first portion of a memory for receiving data;
transmitting the data from the first portion of the memory within a frame;
receiving an acknowledgement in a second frame indicating that a first portion of the data was unsuccessfully transmitted and a second portion of the data was successfully transmitted in response to transmitting the data within the frame;
identifying a second portion of the memory corresponding to the second portion of the data in response to receiving the acknowledgement, wherein the second portion is a subset of the first portion; and
transferring new data to the second portion of the memory according to a priority scheme that determines the sequence of the data transfer.

2. The method of claim 1, wherein the frame comprises one more slots, each slot capable of carrying data, and wherein identifying the second portion of the memory includes updating a first link table to indicate each active slot.

3. The method of claim 2, wherein updating the first link table includes associating each active slot with at least one corresponding memory location.

4. The method of claim 3, wherein the acknowledgement is based on a logical bearer number and wherein identifying the second portion of the memory includes updating a second link table to associate the logical bearer numbers to the slots.

5. The method of claim 4, wherein the second link table is updated in response to an update to the first link table.

6. The method of claim 4, wherein analyzing the acknowledgement includes:
extracting the acknowledgements on logical bearer numbers;
finding the slots corresponding to logical bearer numbers using the second link table;
indexing the first link table using the slots to determine if those slots are active; and
identifying the memory locations associated with the active slots.

7. The method of claim 6, wherein analyzing the acknowledgement includes setting a control bit for each slot indicating whether new data is required in response to determining if the data transmits successfully.

8. The method of claim 1, wherein identifying the second portion of the memory includes identifying the second portion of the memory in response to analyzing the acknowledgement analysis, wherein the size of the second portion of the memory corresponds to the amount of data successfully transferred.

9. The method of claim 8, the first portion of the memory comprising a plurality of buffers and the second portion comprising at least a subset of the plurality of the buffers, wherein transferring the portion of the data according to the priority scheme includes transferring the data to the subset of plurality of buffers based on the order the data from the plurality of buffers is transmitted.

10. An apparatus, comprising:
   a source for providing data;
   a memory having a first portion configured to receive the data from the source;
   transmission logic for transmitting the data from the first portion of the memory within a frame;
   acknowledgement analysis logic capable of:
      receiving an acknowledgement in a second frame in response to transmitting the data within the frame;
      determining that a first portion of the data was unsuccessfully transmitted and a second portion of the data was successfully transmitted; and
      identifying a second portion of the memory corresponding to the second portion of the data in response to receiving the acknowledgement, wherein the second portion is a subset of the first portion; and
   an access controller capable of transferring new data from the source to the second portion of the memory according to a priority scheme that determines the sequence of the data transfer.

11. The method of claim 10, further including control logic capable of updating a corresponding memory location in the source with new data in response to determining if the data transmits successfully.

12. The apparatus of claim 11, wherein the frame comprises one or more slots, each slot capable of carrying data, and wherein the acknowledgement analysis logic includes a first link table capable of identifying active slots.

13. The apparatus of claim 12, wherein the frame comprises one or more slots, each slot capable of carrying data, and wherein the first link table is capable of associating each active slot with at least one corresponding memory location.

14. The apparatus of claim 13, wherein the acknowledgement analysis logic includes a second link table capable of associating the logical bearer numbers to the slots.

15. The apparatus of claim 14, wherein the second link table is capable of being updated substantially simultaneously in response to an update to the first link table.

16. The apparatus of claim 15, wherein the acknowledgement analysis logic is capable of:
   extracting the acknowledgements on logical bearer numbers;
   finding the slots corresponding to logical bearer numbers using the second link table;
   indexing the first link table using the slots to determine if those slots are active; and
   identifying the memory locations associated with the active slots.

17. The apparatus of claim 16, wherein the acknowledgement analysis logic is capable of setting a control bit for each slot indicating whether new data is required in response to determining if the data transmits successfully.

18. The apparatus of claim 10, wherein the first portion of the memory comprises a plurality of buffers and the second portion comprises at least a subset of the plurality of the buffers.

19. The apparatus of claim 18, wherein the access controller is capable of transferring the second portion of the data according to the priority scheme includes transferring the second portion of the data to the subset of plurality of buffers based on the order the data from the plurality of buffers is transmitted.

20. The apparatus of claim 19, wherein the access controller is capable of transferring a portion of data from the source at least one of the plurality of buffers while substantially simultaneously determining if another buffer requires new data.

21. An apparatus, comprising:
   means for defining a first portion of a memory for receiving data;
   means for transmitting the data from the first portion of the memory within a frame;
   means for receiving an acknowledgement in a second frame indicating that a first portion of the data was unsuccessfully transmitted and a second portion of the data was successfully transmitted in response to transmitting the data within the frame;
   means for identifying a second portion of the memory corresponding to the second portion of the data in response to receiving the acknowledgement, wherein the second portion is a subset of the first portion; and
   means for transferring new data to the second portion of the memory according to a priority scheme that determines the sequence of the data transfer.

22. A method for providing data to a plurality of buffers, comprising:
   receiving an acknowledgement in a frame indicating that a first portion of current data in the plurality of buffers transmitted successfully and that a second portion of current data in the plurality of buffers transmitted unsuccessfully;
   transferring new data to the first portion of the plurality of buffers according to a priority scheme; and
   transmitting the new data from the first portion of buffers and the second portion of current data.

23. The method of claim 22, wherein transferring the new data to the first portion of the plurality of buffers according to the priority scheme comprises transferring new data to the first portion of the plurality of buffers based on the order the data in the plurality of buffers are transmitted.

24. The method of claim 22, wherein receiving the acknowledgement comprises:
   extracting the acknowledgement on logical bearer numbers;
   finding at least one slot corresponding to logical bearer numbers, wherein the at least one slot is associated with at least one of the plurality of buffers;
   determining if the slot is active; and
   identifying the at least one buffer associated with the active slot.

25. The method of claim 24, wherein receiving the acknowledgement comprises setting a control bit for each slot indicating whether new data is required in response to determining if the data transmits successfully.

26. A method, comprising:

receiving an acknowledgement in a frame in response to transmitting data in a frame, wherein the frame comprises a plurality of slots, and wherein each slot has at least one corresponding buffer;

determining, on a slot-by-slot basis, whether the data in each of the plurality of slots was successfully transmitted;

determining a first portion of the plurality of buffers corresponding to the plurality of slots containing data that was successfully transmitted; and providing new data to the first portion of the plurality of buffers according to a priority scheme.

27. The method of claim 26, wherein providing the new data to the first portion of the plurality of buffers according to the priority scheme comprises providing the new data to the first portion of the plurality of buffers based on the order the data in the plurality of buffers are transmitted.

28. The method of claim 26, wherein receiving the acknowledgement comprises:

extracting the acknowledgement on logical bearer numbers;

finding at least one slot corresponding to logical bearer numbers;

determining if the slot is active; and identifying the at least one buffer corresponding to the active slot.

29. The method of claim 26, wherein receiving the acknowledgement comprises setting a control bit for each slot indicating whether new data is required in response to determining if the data transmits successfully.

30. An apparatus, comprising:

a source for providing data;

a memory having a plurality of buffers configured to receive the data from the source;

transmission logic for transmitting the data from the plurality of buffers within a frame;

acknowledgement analysis logic capable of receiving an acknowledgement in a second frame indicating that a first portion of data in the plurality of buffers transmitted successfully and that a second portion of data in the plurality of buffers transmitted unsuccessfully; and an access controller capable of:

transferring new data to the first portion of the plurality of buffers according to a priority scheme; and transmitting the new data from the first portion of buffers and the second portion of current data in a subsequent frame.

31. The apparatus of claim 30, wherein the access controller is capable of transferring new data to the first portion of the plurality of buffers based on the order the data in the plurality of buffers are transmitted.

32. The apparatus of claim 30, wherein the acknowledgement analysis logic is capable of:

extracting the acknowledgement on logical bearer numbers;

finding at least one slot corresponding to logical bearer numbers, wherein the at least one slot is associated with at least one of the plurality of buffers;

determining if the slot is active; and identifying the at least one buffer associated with the active slot.

33. The apparatus of claim 30, wherein the acknowledgement analysis logic is capable of setting a control bit indicating whether new data is required in response to determining if the data transmits successfully.

34. An apparatus, comprising:

a source for providing data;

a memory having a plurality of buffers configured to receive the data from the source;

transmission logic for transmitting the data from the plurality of buffers within a frame, wherein the frame comprises a plurality of slots, and wherein each slot is associated with at least one of the plurality of buffers;

acknowledgement analysis logic capable of:

receiving an acknowledgement in a second frame in response to transmitting data in the frame;

determining, on a slot-by-slot basis, whether the data in each of the plurality of slots was successfully transmitted; and an access controller capable of:

determining a first portion of the plurality of buffers corresponding to the plurality of slots containing data that was successfully transmitted; and providing new data to the first portion of the plurality of buffers according to a priority scheme.

35. The apparatus of claim 34, wherein the access controller is capable of providing the new data to the first portion of the plurality of buffers based on the order the data in the plurality of buffers are transmitted.

36. The apparatus of claim 34, wherein the acknowledgement analysis logic is capable of:

extracting the acknowledgement on logical bearer numbers;

finding at least one slot corresponding to the logical bearer numbers;

determining if the slot is active; and identifying the at least one buffer corresponding to the active slot.

37. The apparatus of claim 34, wherein the acknowledgement analysis logic is capable of setting a control bit for each slot indicating whether new data is required in response to determining if the data transmits successfully.

* * * * *

UNITED STATES PATENT AND TRADEMARK OFFICE
CERTIFICATE OF CORRECTION

PATENT NO. : 6,625,128 B1  Page 1 of 1
DATED : September 23, 2003
INVENTOR(S) : Jagannathan Bharath and David N. Larson It is certified that error appears in the above-identified patent and that said Letters Patent is hereby corrected as shown below:

Column 2,
Line 11, replace "art." with -- art, --.
Line 46, replace "it not all" with -- if not all --.

Column 4,
Line 5, replace "DFCT" with -- DECT --.

Column 6,
Line 10, Table 1, replace "DBCT" with -- DECT --.
Line 51, replace "service." with -- service, --.

Column 9,
Line 39, replace "WLL," with -- WLL --.

Column 13,
Line 23, replace "14." with -- 14, --.
Line 31, replace "i.e.." with -- i.e., --.

Signed and Sealed this

Eighteenth Day of November, 2003

JAMES E. ROGAN
*Director of the United States Patent and Trademark Office*